July 2, 1929. A. J. HOSIER 1,719,370
MILKING SHED AND APPARATUS FOR USE THEREWITH
Filed Oct. 10, 1928 2 Sheets-Sheet 1
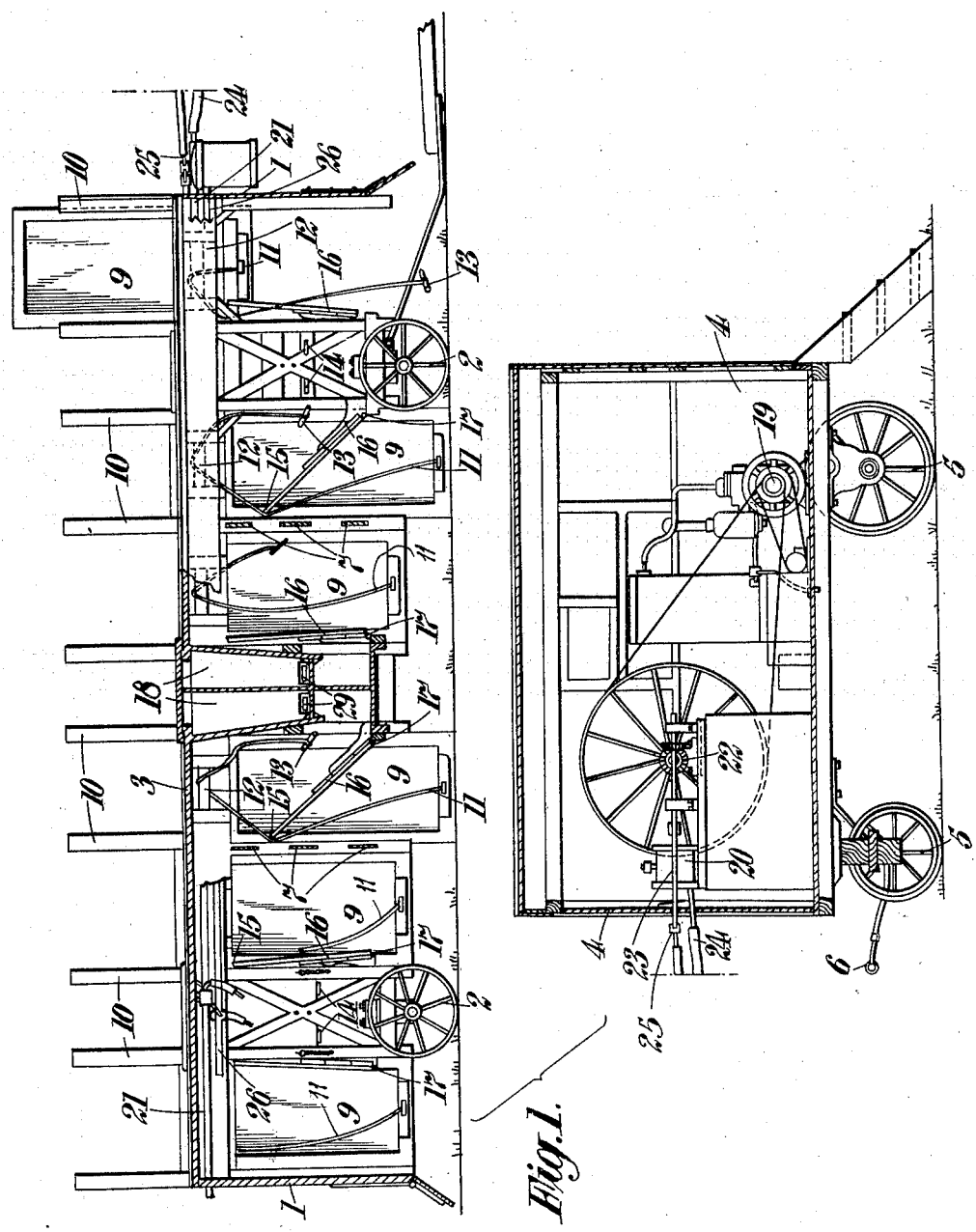
INVENTOR,
Arthur J. Hosier,
BY
ATTORNEYS.

July 2, 1929.  A. J. HOSIER  1,719,370
MILKING SHED AND APPARATUS FOR USE THEREWITH
Filed Oct. 10, 1928  2 Sheets-Sheet 2
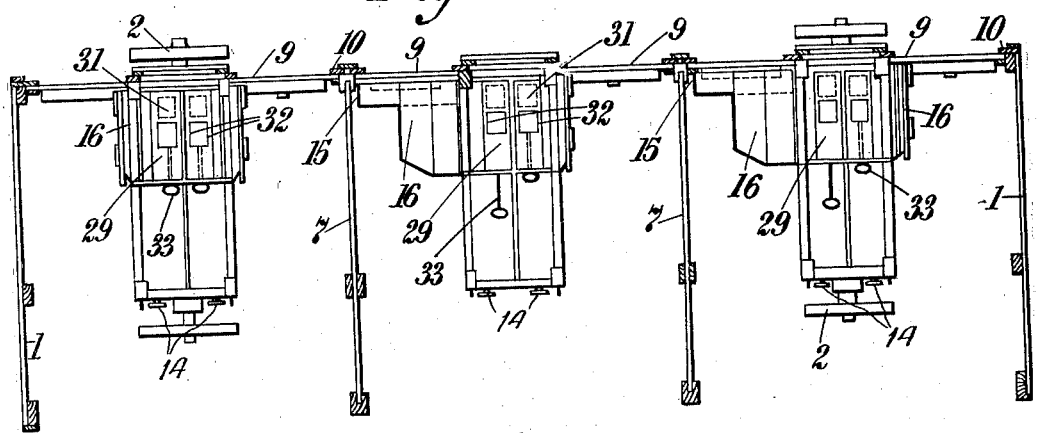
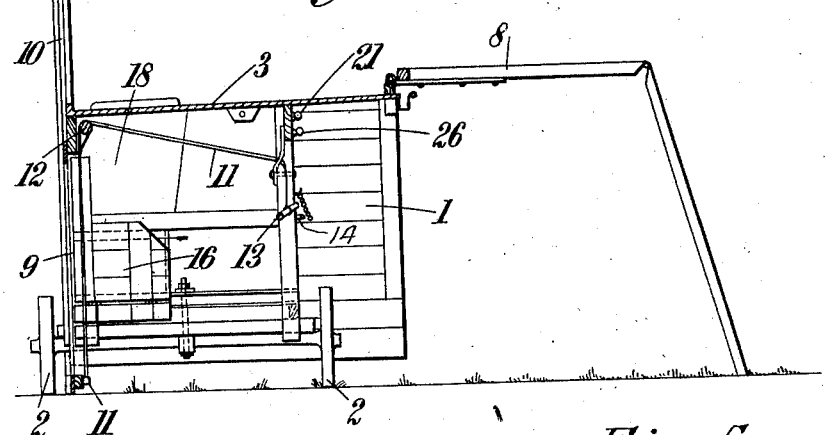
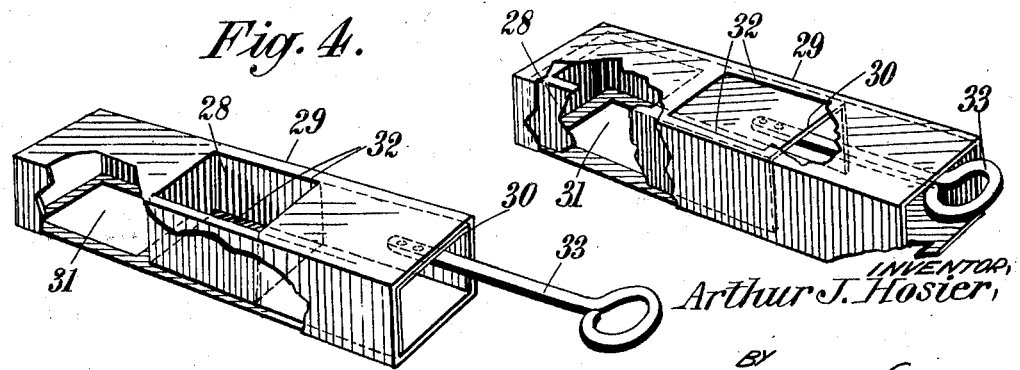
Arthur J. Hosier, INVENTOR
by Baldwin Wight
ATTORNEYS.

Patented July 2, 1929.

1,719,370

UNITED STATES PATENT OFFICE.

ARTHUR JULIUS HOSIER, OF BURBAGE, MARLBOROUGH, ENGLAND, ASSIGNOR TO HOSIER OPEN AIR PURE MILKER, LIMITED, OF WEXCOMBE, MARLBOROUGH, ENGLAND.

MILKING SHED AND APPARATUS FOR USE THEREWITH.

Application filed October 10, 1928, Serial No. 311,666, and in Great Britain August 26, 1927.

This invention relates to impovements in milking sheds for use with milking apparatus.

One object of the present invention is to provide means for feeding the cows as they are being milked.

Another object of the invention is to provide means by which a definite quantity of food, such as cake, can be supplied to each cow.

A further object of the invention is to provide means by which the manger to which the food is delivered may be raised out of the way when an exit door for the cow is raised.

In carrying out the invention one form of apparatus comprises a shed mounted upon wheels and divided by partitions to form stalls. At the end of each stall is a vertically sliding door which can be raised to allow a cow to leave the stall after she has been milked. Located close to the sliding door is a manger so connected to the said door that when it is opened, the said manger is automatically folded back out of the way.

In the accompanying drawings which illustrate the invention, Figure 1 is a longitudinal sectional view of the milking shed and engine hut, Figure 2 a horizontal sectional view of the shed, Figure 3 a transverse sectional view and Figures 4 and 5 are perspective views of a measuring device showing the parts in their two extreme positions.

Referring to Figures 1 to 3, 1 is a shed mounted upon wheels 2 and equipped with a roof 3. 4 is an engine hut mounted upon wheels 5 and adapted to be coupled by a draw bar 6 to the shed 1. The shed 1 is divided by partitions 7 to form a plurality of stalls in which the cows stand whilst being milked and fed. A collapsible cow shelter 8 may be fastened to roof 3. At the end of each stall is a door 9 which is slidable vertically in guides 10 on shed 1 and to the lower edge of each door 9 is secured one end of a rope 11 which passes over guides 12 and has at its other end a hand grip 13, cleats 14 being provided on to which the rope can be wound to position the door. The rope is so arranged that it engages or abuts intermediate its ends an extension or wall 15 provided at 17 on a manger 16. 18 is a hopper in which is placed food such as cake. The quantity of food supplied to the manger 16 is controlled by a measuring device, such as that shown in Figures 4 and 5.

Located within the hut 4 is an engine 19 driving a suction pump 20 which is disposed in communication with the teat cups of any usual milking apparatus, through a pipe 21 and 22 represents any convenient mechanism actuated by the engine 19 for rotating a shaft 23 which actuates the "pulsator" of the milking apparatus, the pulsator breaking the vacuum to which the teat cups are subjected, say, 45 times a minute, whereby the teat cups are alternately collapsed and expanded in the known manner. The pipe 21 is connected to the suction pump by a rubber tube 24 and the shaft 23 is connected to the actuating mechanism by universal joints, indicated generally at 25.

26 is a pipe-line which is in communication with each teat cup and through which the milk flows to any convenient urn or container, the said pipe-line being provided with a "releaser" operated in known manner by a pulsator.

The pipe-lines 21 and 26 preferably comprise nickel-plated tubes.

In operation, when a cow is to be milked, she is led into a stall, the door 9 of which is closed, the manger wall 16 being thereby in the lowered position. A measured quantity of food is then delivered to the manger as is described with reference to Figures 4 and 5. After the cow has been milked and fed, the rope 11 is pulled, whereby the door 9 is raised to the position shown on the extreme right of Figure 1, the engagement between the rope 11 and the extension 15 serving automatically to raise and maintain the manger wall 16 out of the way. Normally the doors 9 rest on the ground as in Figures 1 and 3 to aid in anchoring the shed, but when it is desired to transport the shed, the doors 9 are raised a short distance from the ground, as is shown, for example, in the case of the two left hand stalls in Figure 1.

Referring now to Figures 4 and 5, 28 is a measure open at the top and bottom, and slidably mounted within a fixed casing 29 which may be secured, as shown in Figure 1, to the lower end of each hopper 18. The measure is provided on its upper side with a plate 30, so arranged that when the measure is in communication with an aperture 31 formed in the lower plate of the casing 29 and in communication with the manger 16, the said plate seals an aperture 32 which is formed in the upper plate of the casing 29 and is in communication with the hopper. The lower plate of the casing 29 forms the bottom of the measure when the latter is in communication with the hopper 18. 33 is an operating handle secured to the measure.

In operation, assuming that the measure is in communication with the aperture 32, and hence with the hopper, food passes from the hopper into said measure. When it is desired to deliver the food to the manger, the measure is slid away from the aperture 32 until it is in communication with the aperture 31, the food contained in the measure passing therethrough to the manger, the aperture 32 being sealed and hence food being prevented from passing from the hopper by the plate 30.

What I claim is:—

1. In a shed of the class described, a stall body, wheels mounting said body whereby it is portable, a roof on said body, guide means extending above and below said roof, a door slidably mounted on said guide means constituting an outlet from the stall body, said door normally resting on the ground to aid in anchoring the shed.

2. In a shed of the class described, a door therefor, a manger in the shed having a movable wall normally disposed across the path of access to the door, and an operating means common to said door and wall, to simultaneously move the wall out of said path and open the door.

3. In a shed of the class described, a door therefor, a manger in the shed having a movable wall normally disposed across the path of access to the door, and means to open the door disposed to also move the wall out of said path incidental to opening of the door.

4. In a shed of the class described, an upwardly movable door therefor, a manger in the shed having a movable wall normally disposed across the path of access to the door, and a flexible operating element extending from said door, said element engaging said wall whereby the latter will be moved out of said path incidental to opening of the door.

5. In a shed of the class described, a body provided with a door-way having an abutment on one side thereof and a manger and a feeding means on the other side thereof, said manger having a wall normally disposed across the path of access to the door and engaging said abutment, a flexible element connected to the door, guide means on the body above said wall over which the flexible element is trained, said element being operable to open the door, and said element also engaging said wall whereby the latter will be moved into abutment with the feed means as the door is opened.

6. In a shed of the class described, a stall body having an outlet door, a roof, guide members on said body extending above and below said roof slidably mounting said door, a feed hopper accessible through said roof disposed within the body and on one side of said door, an abutment on the other side of said door, a manger below said hopper having a movable end wall normally disposed across the path of access to the door and against said abutment, means whereby the contents of the hopper may be discharged into the manger, a flexible element connected to the door and operable to raise the same, guide means on the body above the door over which the flexible element passes, said flexible element normally being slack and in engagement with said wall whereby the wall is moved against the hopper incidental to raising of the door.

In testimony that I claim the foregoing as my invention I have signed my name this twenty-ninth day of September, 1928.

ARTHUR JULIUS HOSIER.